(12) United States Patent
Stacklies et al.

(10) Patent No.: US 6,733,369 B1
(45) Date of Patent: May 11, 2004

(54) METHOD AND APPARATUS FOR POLISHING OR LAPPING AN ASPHERICAL SURFACE OF A WORK PIECE

(75) Inventors: Siegfried Stacklies, Abtsgmuend (DE); Yaolong Chen, Aalen (DE)

(73) Assignee: Carl Zeiss Semiconductor Manufacturing Technologies, AG, Oberkochen (DE)

(*) Notice: Subject to any disclaimer, the term of this patent is extended or adjusted under 35 U.S.C. 154(b) by 0 days.

(21) Appl. No.: 10/261,455

(22) Filed: Sep. 30, 2002

(51) Int. Cl.⁷ .............................................. B24B 1/00
(52) U.S. Cl. ........................ 451/42; 451/5; 451/8; 451/10; 451/41; 451/42; 451/172; 451/255; 451/256; 451/277; 451/365; 451/384; 451/385; 451/397
(58) Field of Search .................. 451/5, 8, 10, 41, 451/42, 172, 255, 256, 277, 365, 384, 385, 397

(56) References Cited

U.S. PATENT DOCUMENTS 4,956,944 A * 9/1990 Ando et al. .................. 451/5
5,138,798 A * 8/1992 Volat ........................... 165/77

FOREIGN PATENT DOCUMENTS

| DE | 198 45 166 A1 | 4/2000 |
| DE | 201 02 684 U1 | 6/2001 |
| EP | 0 835 722 A1 | 4/1998 |
| JP | 08131257 A | 5/1996 |
| JP | 09085613 A | 3/1997 |
| JP | 09190934 A | 4/1997 |
| WO | WO 97/00155 | 1/1997 |

* cited by examiner

Primary Examiner—Joseph J. Hail, III
Assistant Examiner—Shantese McDonald
(74) Attorney, Agent, or Firm—Wells St. John P.S.

(57) ABSTRACT

An apparatus for polishing or lapping an aspherical surface of a work piece comprises a tool rotatable about an axis, the working surface area of the tool being smaller than the work piece, and an arrangement by means of which the tool and the work piece are adjustable relative to each other in all three directions in space, by means of which the orientation of the tool relative to the work piece is adjustable about at least two axes, and by means of which the work piece is rotatable about an axis.

12 Claims, 2 Drawing Sheets

METHOD AND APPARATUS FOR POLISHING OR LAPPING AN ASPHERICAL SURFACE OF A WORK PIECE

BACKGROUND OF THE INVENTION

1. Field of the Invention

The invention relates to a method and an apparatus for polishing or lapping an aspherical surface of a work piece comprising a tool rotatable about an axis, the working surface area of the tool being smaller than the work piece.

2. Description of the Related Art

In WO 97/00155 A1 there is described a method and an apparatus for optical polishing. The tool used in this method has a flexible working surface and means for selectively varying the pressure applied on the work piece by different regions of the tool working surface. Thereby the effective area of contact between the tool and the work piece can be varied.

The problem of this known apparatus as well as of many other similar apparatus is the complicated and time consuming movement of the tool along the surface of the work piece due to its aspherical shape.

Another apparatus for lapping and/or polishing an aspherical surface is known from EP 0 835 722 A1. The tool used for working the surface is ball-shaped, so that there is only minimal contact between the tool and the work piece, leading to an increase of the operating time.

DE 201 02 684 U1 describes a grinding wheel containing a support made of metal and an outer grinding part containing e.g. diamond as grinding material. Between these two parts there is located a distance ring serving as vibration damper.

Concerning further documents representing the state of the art in the field of polishing or lapping of surfaces using tools, reference is made to JP 09109034 A and JP 09085613 A.

SUMMARY OF THE INVENTION

It is an object of the present invention to decrease the time necessary for polishing or lapping the aspherical work piece as well as to increase the accuracy of the process.

This object is solved by an apparatus for polishing or lapping an aspherical surface of a work piece comprising a tool rotatable about an axis, the working surface area of the tool being smaller than the work piece, and an arrangement by means of which the tool and the work piece are adjustable relative to each other in all three directions in space, by means of which the orientation of the tool relative to the work piece is adjustable about at least two axes, and by means of which the work piece is rotatable about an axis.

The advantage of the apparatus according to the invention is its very high flexibility making it possible to adjust and orientate the tool and the work piece relative to one another in six axes, including the axis of rotation of the work piece. This allows the correction of shape defects of the work piece and makes it possible to obtain the exact aspherical surface as necessary. Apart from the higher speed made possible by the invention, the accuracy of the process is also enhanced.

Another aspect of the invention concerns a method of polishing or lapping an aspherical surface of a work piece with a tool rotating about an axis, the working surface area of the tool being smaller than the work piece, adjusting the tool and the work piece relative to each other in all three directions in space, adjusting the orientating of the tool relative o the work piece about at least two axes, and rotating the work piece about an axis.

With this method, work pieces with aspherical surfaces can be polished or lapped quicker and more accurate.

Possible improvements and advantageous embodiments of he invention are given in the dependent claims.

The accompanying drawing illustrates, in a schematic elevation, the best mode of the apparatus according to the present invention.

DETAILED DESCRIPTION

Figure 1:
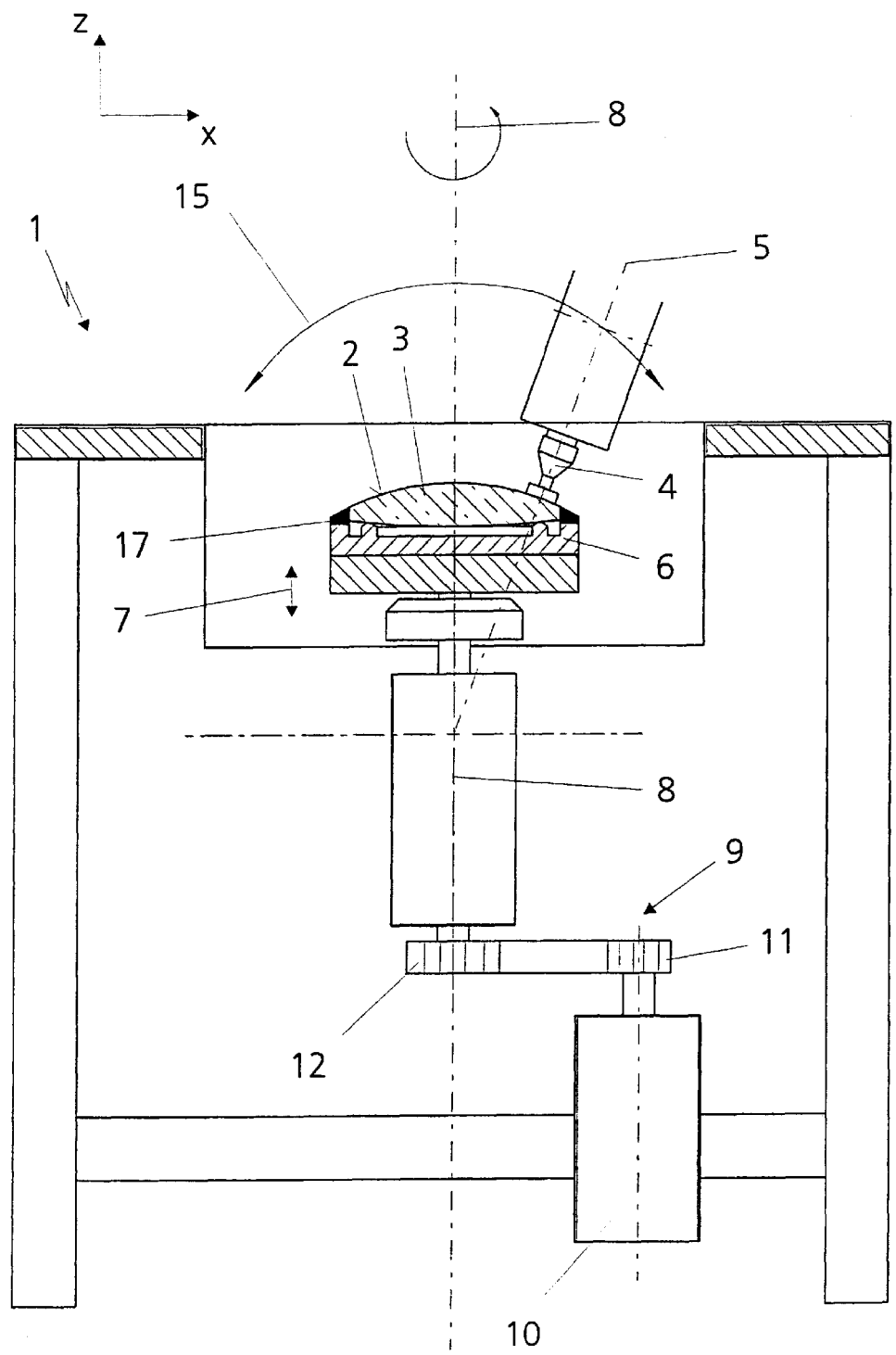
FIG. 1 shows a side view of the apparatus according to the invention.

FIG. 1 shows an apparatus 1 for polishing and/or lapping an aspherical surface 2 of a work piece 3. The apparatus 1 comprises a ring-shaped tool 4, which is rotatable about an axis 5. As can clearly be seen from FIG. 1, the working surface area of tool 4 is smaller than the work piece 3. The ring-shape of tool 4 decreases the inner stability of tool 4 so that tool 4 can more easily adapt to surface 2. The shape of tool 4 can be varied dependent on the shape of work piece 3.

Depending on the material used between tool 4 and work piece 3, apparatus 1 polishes or lapps work piece 3 by moving tool 4 over work piece 3. Therefore, apparatus 1 can be used for both working methods, i.e. polishing or lapping.

In the present case, work piece 3 is an optical lens containing the aspherical surface 2. However, it is also possible, e.g. to polish or lap a casting mould used to cast the lens or another work piece 3 with an aspherical surface.

The work piece 3 is held in a clamp 6, which is adjustable in height, the possible adjustment being shown by arrow 7. Together with work piece 3, clamp 6 can be rotated about an axis 8 of work piece 3 with a rotating means 9. Rotating means 9 contains an electric motor 10, a first transmission 11 and a second transmission 12 and is NC-controlled to make it possible to rotate clamp 6 with work piece 3 to any position. In a way not shown in FIG. 1, clamp 6 with work piece 3 could also be rotated directly, i.e. without any transmissions.

Figure 2:
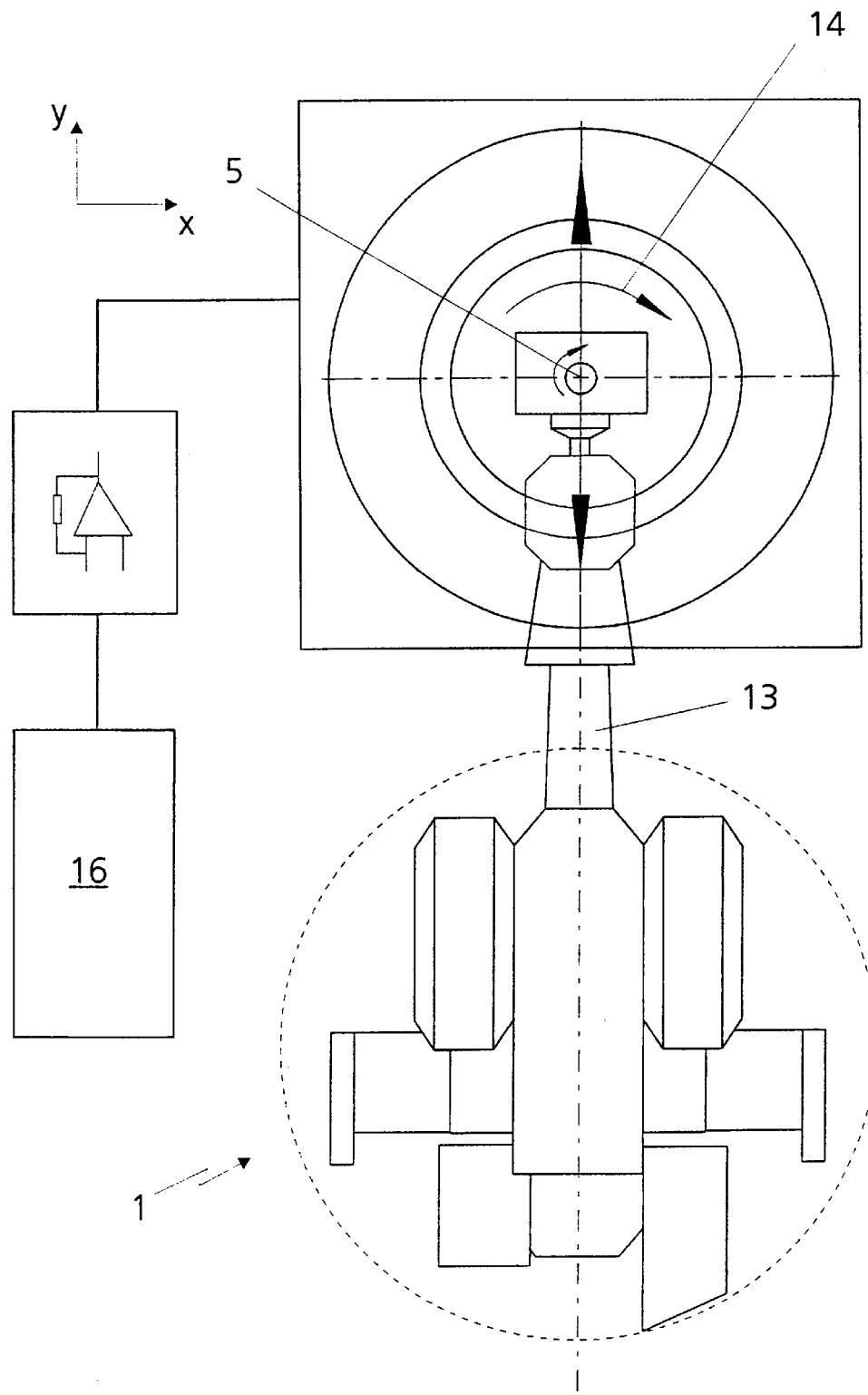
FIG. 2 shows a view from above of the apparatus of FIG. 1.

As can be seen from FIG. 2, apparatus 1 contains a robot-arm 13 on the outer end of which there is fixed tool 4. Robot-arm 13 comprises at least five axes, in the present case it contains six axes. In this way, it is possible to adjust tool 4 relative to work piece 3 in all three directions x, y, z (shown in the drawing) in space. Furthermore it is thereby possible to adjust the orientation of tool 4 relative to work piece 3 about two further axes 14 and 15, the possible movement of robot-arm 13 about these axes 14 and 15 being shown in FIGS. 1 and 2 respectively.

In this way, it can be made sure that tool 4 is always orientated rectangular to work piece 3. Still further, in a way not shown in the figures, robot-arm 13 contains rotating means being able to rotate tool 4 about its axis 5 mentioned above. Axis 5 thus forms the sixth axis of the robot-arm 13 with the directions x, y, and z being the first three axes and axes 14 and 15 being the fourth and fifth axis respectively.

The movements of robot-arm 13 are controlled by a computer control 16 and it is therefore possible with apparatus 1 to orientate and to move tool 4 relative to work piece 3 in such a way that the aspherical surface 2 of work piece 3 can be lapped or polished in a very short time and with high precision, both in dimension and in shape of work piece 3. The information used by the computer control 16 to control the movement of robot-arm 13 can include polishing or lapping material, temperature, time of contact between tool 4 and a certain part of surface 2, pressure, and number of revolutions of tool 4 and work piece 3. For example, if at a certain part of surface 2 more abrasion is needed, computer control 16 increases the time of contact between tool 4 and this certain part of surface 2.

Since the rotating means 9 is able to rotate work piece 3 about its axis 8 independently from the movement of robot-arm 13 and thus from the movement of tool 4, the time in which tool 4 is in contact with a certain part of work piece 3 and therefore this certain part of work piece 3 is polished or lapped can be adjusted in a very exact manner.

In order to make it possible for tool 4 to polish or lap the surface 2 of work piece 3 as evenly as possible, an outer rim 17 of clamp 6 is made of substantially the same material as work piece 3 so that tool 4 experiences no changes in adhesion and structure of surface 2. Furthermore, since tool 4 can move over the rim 17 of clamp 6, the edge of work piece 3 is not rounded. Since work piece 3 is most likely made from glass, rim 17 of clamp 6 would most likely be made of glass as well.

What is claimed is:

1. Apparatus for polishing or lapping an aspherical surface of a work piece comprising a tool rotatable about an axis, the working surface area of the tool being smaller than the work piece, and an arrangement by means of which the tool and the work piece are adjustable relative to each other in all three directions in space, by means of which the orientation of the tool relative to the work piece is adjustable about at least two axes, and by means of which the work piece is rotatable about an axis, and
    wherein said work piece is held in a clamp, the rim of the clamp being made of substantially the same material as the work piece.

2. The apparatus of claim 1, wherein said arrangement contains a robot-arm comprising at least five axes and being controlled by a computer-control.

3. The apparatus of claim 2, wherein said robot-arm further comprises the rotating axis of the tool.

4. The apparatus of claim 2, wherein said arrangement contains means for rotating the work piece about its axis independently of the movement of the robot-arm.

5. The apparatus of claim 4, wherein said means for rotating the work piece is NC-controlled.

6. The apparatus of claim 1, wherein said tool is ring-shaped.

7. Apparatus for polishing or lapping an aspherical surface of a work piece comprising a tool rotatable about an axis, the working surface area of the tool being smaller than the work piece, and an arrangement by means of which the tool and the work piece are adjustable relative to each other in all three directions in space, by means of which the orientation of the tool relative to the work piece is adjustable about at least two axes, and by means of which the work piece is rotatable about an axis; and
    wherein said work piece is held in a clamp, the rim of the clamp being made of substantially the same material as the work piece, and said clamp is adjustable in height.

8. The apparatus of claim 7, wherein said arrangement contains a robot-arm comprising at least five axes and being controlled by a computer-control.

9. The apparatus of claim 8, wherein said robot-arm further comprises the rotating axis of the tool.

10. The apparatus of claim 8, wherein said arrangement contains means for rotating the work piece about its axis independently of the movement of the robot-arm.

11. The apparatus of claim 10, wherein said means for rotating the work piece is NC-controlled.

12. The apparatus of claim 7, wherein said tool is ring-shaped.

* * * * *

UNITED STATES PATENT AND TRADEMARK OFFICE
CERTIFICATE OF CORRECTION

PATENT NO. : 6,733,369 B1
DATED : May 11, 2004
INVENTOR(S) : Siefried Stacklies et al.

It is certified that error appears in the above-identified patent and that said Letters Patent is hereby corrected as shown below:

Column 2,
Line 2, replace "relative o the work piece about at least two axes, and rotating" with
-- relative to the work piece about at least two axes, and rotating --
Line 7, replace "of he invention are given in the dependent claims." with
-- of the invention are given in the dependent claims. --

Column 3,
Line 31, replace "piece 3, apparatus 1 polishes or lapps work piece 3 by" with
-- piece 3, apparatus 1 polishes or laps work piece 3 by --

Signed and Sealed this

Twenty-second Day of February, 2005

JON W. DUDAS
*Director of the United States Patent and Trademark Office*